US009541431B2

(12) United States Patent
Nakano et al.

(10) Patent No.: US 9,541,431 B2
(45) Date of Patent: Jan. 10, 2017

(54) ULTRASONIC FLOW METER UNIT WITH AN INSULATING DAMPING MEMBER COVERING THE ULTRASONIC TRANSDUCERS, A MEASURING CIRCUIT AND LEAD WIRES

(71) Applicant: Panasonic Intellectual Property Management Co., Ltd., Osaka-shi, Osaka (JP)

(72) Inventors: Makoto Nakano, Kyoto (JP); Hajime Miyata, Kyoto (JP); Yuji Fujii, Nara (JP)

(73) Assignee: Panasonic Intellectual Property Management Co., Ltd. (JP)

( * ) Notice: Subject to any disclaimer, the term of this patent is extended or adjusted under 35 U.S.C. 154(b) by 59 days.

(21) Appl. No.: 14/404,314

(22) PCT Filed: Jun. 4, 2013

(86) PCT No.: PCT/JP2013/003506
§ 371 (c)(1),
(2) Date: Nov. 26, 2014

(87) PCT Pub. No.: WO2013/183283
PCT Pub. Date: Dec. 12, 2013

(65) Prior Publication Data
US 2015/0143919 A1 May 28, 2015

(30) Foreign Application Priority Data
Jun. 5, 2012 (JP) .................................. 2012-127761

(51) Int. Cl.
*G01F 1/66* (2006.01)
(52) U.S. Cl.
CPC ................. *G01F 1/66* (2013.01); *G01F 1/662* (2013.01)

(58) Field of Classification Search
None
See application file for complete search history.

(56) References Cited

U.S. PATENT DOCUMENTS 3,925,692 A * 12/1975 Leschek ................ B06B 1/0685
310/327
3,979,565 A * 9/1976 McShane ............... H04R 17/00
310/312
(Continued)

FOREIGN PATENT DOCUMENTS

| JP | 04-192397 A | 7/1992 |
| JP | 2003-302385 A | 10/2003 |

(Continued)

OTHER PUBLICATIONS

English Translation of International Search Report for PCT/JP2013/003506 dated Aug. 7, 2013, 2 pages.
(Continued)

*Primary Examiner* — Harshad R Patel
(74) *Attorney, Agent, or Firm* — Brinks Gilson & Lione

(57) ABSTRACT

An ultrasonic flow meter unit, mounted to a fluid passage through which a measurement target fluid flows, comprises a pair of ultrasonic transducers each including a piezoelectric substrate, and an acoustic matching member; a measuring circuit which measures a flow of a target fluid based on time for which an ultrasonic pulse propagates between the pair of ultrasonic transducers; and an insulating damping member unitarily formed to cover at least a portion of each of a portion of each of the pair of ultrasonic transducers, which portion contacts the fluid passage, the piezoelectric substrate, and the measuring circuit.

5 Claims, 9 Drawing Sheets

(56) References Cited

U.S. PATENT DOCUMENTS

| | | | | |
|---|---|---|---|---|
| 4,240,004 | A | * | 12/1980 | Coleman ............... B06B 1/0685 310/327 |
| 5,406,027 | A | | 4/1995 | Matsumoto et al. |
| 5,814,736 | A | | 9/1998 | Löschberger et al. |
| 6,268,683 | B1 | * | 7/2001 | Li .......................... G01F 1/662 310/312 |
| 8,288,920 | B2 | * | 10/2012 | Mueller ............... G10K 11/002 310/326 |
| 8,988,971 | B2 | * | 3/2015 | Mueller ............... G01F 23/296 367/140 |
| 9,097,569 | B2 | * | 8/2015 | Mueller ............... B06B 1/0655 73/592 |
| 2007/0157728 | A1 | | 7/2007 | Endou |
| 2012/0266677 | A1 | * | 10/2012 | Mueller ............... G01F 23/296 73/632 |
| 2012/0266690 | A1 | | 10/2012 | Ozaki et al. |
| 2013/0036832 | A1 | * | 2/2013 | Watanabe ............... G01F 1/662 73/861.18 |
| 2013/0061686 | A1 | | 3/2013 | Fujii et al. |
| 2014/0086017 | A1 | * | 3/2014 | Nakano .................. G01F 1/662 367/180 |
| 2015/0128723 | A1 | * | 5/2015 | Satou ..................... G01F 1/662 73/861.28 |
| 2015/0292927 | A1 | * | 10/2015 | Satou ..................... G01F 1/66 73/861.29 |

FOREIGN PATENT DOCUMENTS

| | | | | |
|---|---|---|---|---|
| JP | 2007-183185 | A | | 7/2007 |
| JP | 2011-128146 | A | | 6/2011 |
| JP | 2012-007975 | A | | 1/2012 |
| JP | 2012-021782 | | * | 2/2012 ............... G01F 1/66 |
| JP | 2012-021782 | A | | 2/2012 |
| JP | 2012-021899 | A | | 2/2012 |

OTHER PUBLICATIONS

Extended European Search Report in corresponding European Application No. 13799845.6, dated Jul. 13, 2015, 6 pages.

* cited by examiner

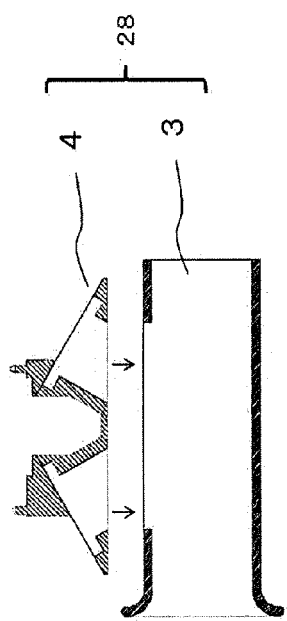
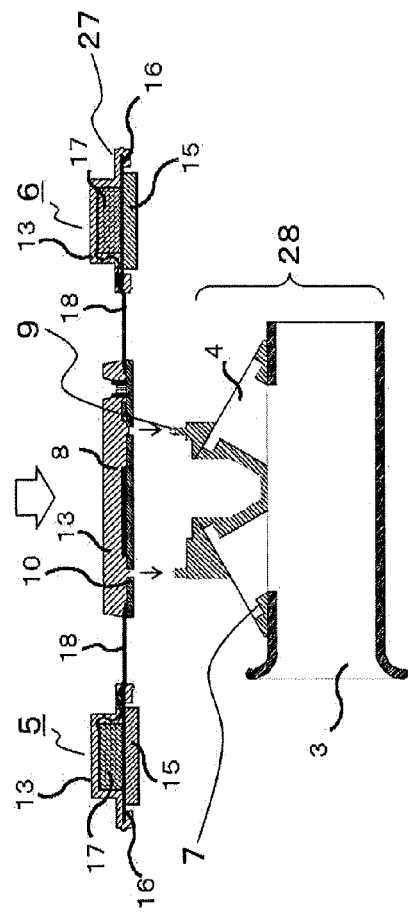
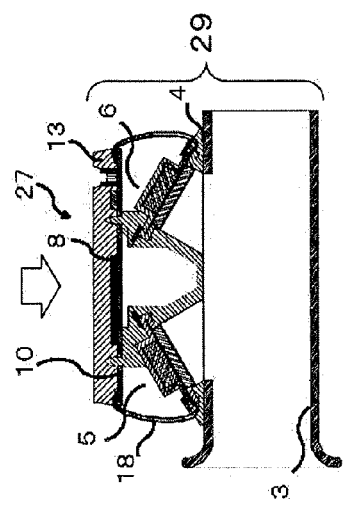
FIG. 4A
FIG. 4B
FIG. 4C

ULTRASONIC FLOW METER UNIT WITH AN INSULATING DAMPING MEMBER COVERING THE ULTRASONIC TRANSDUCERS, A MEASURING CIRCUIT AND LEAD WIRES

This application is a 371 application of PCT/JP2013/003506 having an international filing date of Jun. 4, 2013, which claims priority to JP 2012-127761 filed Jun. 5, 2012, the entire contents of which are incorporated herein by reference.

TECHNICAL FIELD

The present invention relates to an ultrasonic flow meter unit which measures a transit time (propagation time) for which an ultrasonic pulse propagates between a pair of ultrasonic transducers (transmitters/receivers) which are capable of transmitting/receiving an ultrasonic pulse, by using the pair of ultrasonic transducers, and measures the flow of a target fluid based on the transit time, and a manufacturing method of the ultrasonic flow meter unit.

BACKGROUND ART

Conventionally, as shown in FIG. 9, this type of ultrasonic flow meter unit includes, for example, a measurement passage 50 through which a target fluid flows, and a pair of ultrasonic transducers 51, 52 which are placed at an upstream side and a downstream side of the measurement passage 50, respectively, and which are capable of transmitting/receiving an ultrasonic signal. The measurement passage 50 is formed of a resin. Each of the ultrasonic transducers 51, 52 includes a piezoelectric element 53, a terminal 54 through which a voltage is applied to the piezoelectric element 53, and an acoustic matching layer 55 bonded to a transmission-side surface of the terminal 54. Each of the ultrasonic transducers 51, 52 is fastened to an ultrasonic transducer mounting section 56 mounted to the measurement passage 50 via a coating material 57 having an elasticity, thereby constituting an ultrasonic flow meter unit 58 (e.g., see Patent Literature 1).

CITATION LIST

Patent Literature

Patent Literature 1: Japanese-Laid Open Patent Application Publication No. 2012-21899

SUMMARY OF THE INVENTION

Technical Problem

In the above described conventional configuration, each of the ultrasonic transducers 51, 52 is fastened to the ultrasonic transducer mounting section 56 via the elastic coating material 57. However, a measuring circuit (not shown), a contact portion between the measuring circuit and the fluid passage, lead wires, and others are not fastened to the ultrasonic transducer mounting section 56 by the elastic coating material 57. Because of this, there is a room for improvement of flow measuring precision of a target fluid by the ultrasonic flow meter unit.

As a solution to this, the measuring circuit, the contact portion between the measuring circuit and the fluid passage, the lead wires, and others may be fastened to the ultrasonic transducer mounting section by a coating material. In this case, when fastening of each of the ultrasonic transducers 51, 52, and fastening of other members (the measuring circuit, the contact portion between the measuring circuit and the fluid passage, the lead wires, and others) are performed independently, the improvement of measuring precision of the flow is not sufficient. For example, vibration suppression elements may be non-uniform among the fastening locations. In this case, the vibration suppression elements are unable to well suppress a vibration of the ultrasonic transducer 51, 52 which has transmitted an ultrasonic signal. For this reason, the vibration of the ultrasonic transducer 51, 52 which has transmitted the ultrasonic signal becomes a reverberant noise, which becomes a noise in measurement of the fluid. When the vibration of the ultrasonic transducer 51, 52 which has transmitted the ultrasonic signal is transmitted to the ultrasonic transducer 51, 52 which receives the ultrasonic signal through the fluid passage, the lead wire, and the measuring circuit, a casing propagation noise is generated. Furthermore, due to the vibration transmitted from the ultrasonic transducer 51, 52 to the members, a unique vibration may occur in each of these members. In this case, this vibration becomes the reverberant noise. Due to the reverberant noise or the casing propagation noise, a flow measurement accuracy is decreased.

Also, when fastening of each of the ultrasonic transducers 51, 52, and fastening of other members (the measuring circuit, the contact portion between the measuring circuit and the fluid passage, the lead wires, and others) are performed independently, a productivity is low.

The elastic coating material 57 is required to be placed stationarily at a room temperature for a specified time, or left under a constant temperature and a constant humidity, for a curing reaction, etc. This also reduces a productivity.

The present invention is directed to solving the above described problem associated with the prior art, and an object of the present invention is to provide an ultrasonic flow meter unit which can reduce a casing propagation noise and a reverberant noise which become a noise in flow measurement, and improve a productivity of the ultrasonic flow meter unit, and a manufacturing method thereof.

Solution to Problem

To solve the above mentioned problem, according to the present invention, there is provided an ultrasonic flow meter unit mounted to a fluid passage through which a measurement target fluid flows, the ultrasonic flow meter unit comprising: a pair of ultrasonic transducers each including a piezoelectric substrate which generates an ultrasonic pulse, and an acoustic matching member, the pair of ultrasonic transducers being placed on the fluid passage such that the ultrasonic transducers mutually transmit and receive the ultrasonic pulse; a measuring circuit which is placed to contact the fluid passage, and measures a flow of the measurement target fluid based on time for which the ultrasonic pulse propagates between the pair of ultrasonic transducers; and an insulating damping member unitarily formed to cover at least a portion of each of a portion of each of the pair of ultrasonic transducers, which portion contacts the fluid passage, the piezoelectric substrate, and the measuring circuit.

In this configuration, it becomes possible to effectively reduce a casing propagation noise which is generated by transmission of a vibration generated in one of the pair of ultrasonic transducers to the other ultrasonic transducer, through the fluid passage or the measuring circuit, and a reverberant noise induced by the vibrations transmitted to the members, thus implementing highly-accurate flow measurement.

According to the present invention, there is provided a method of manufacturing an ultrasonic flow meter unit comprising: placing ultrasonic transducers and a measuring circuit into a die; electrically connecting the ultrasonic transducers to the measuring circuit, via lead wires; and pouring an insulating suppression material into the die to form insulating damping members together which cover the ultrasonic transducers, the measuring circuit, and the lead wires, at the same time. This allows the insulating damping member to be unitarily formed over required portions of the ultrasonic transducers and the measuring circuit, with a high accuracy and in a short time, which can significantly improve a productivity.

Advantageous Effects of Invention

The present invention has advantages that it becomes possible to provide an ultrasonic flow meter unit which is high in productivity and is capable of implementing highly-accurate flow measurement, and a manufacturing method thereof.

BRIEF DESCRIPTION OF THE DRAWINGS

FIGS. 4A, 4B, and 4C are cross-sectional views for explaining the procedure for manufacturing, in which the ultrasonic flow meter unit of Embodiment 1 of the present invention is mounted to a fluid passage.

DETAILED DESCRIPTION OF THE PREFERRED EMBODIMENTS

Figure 1:
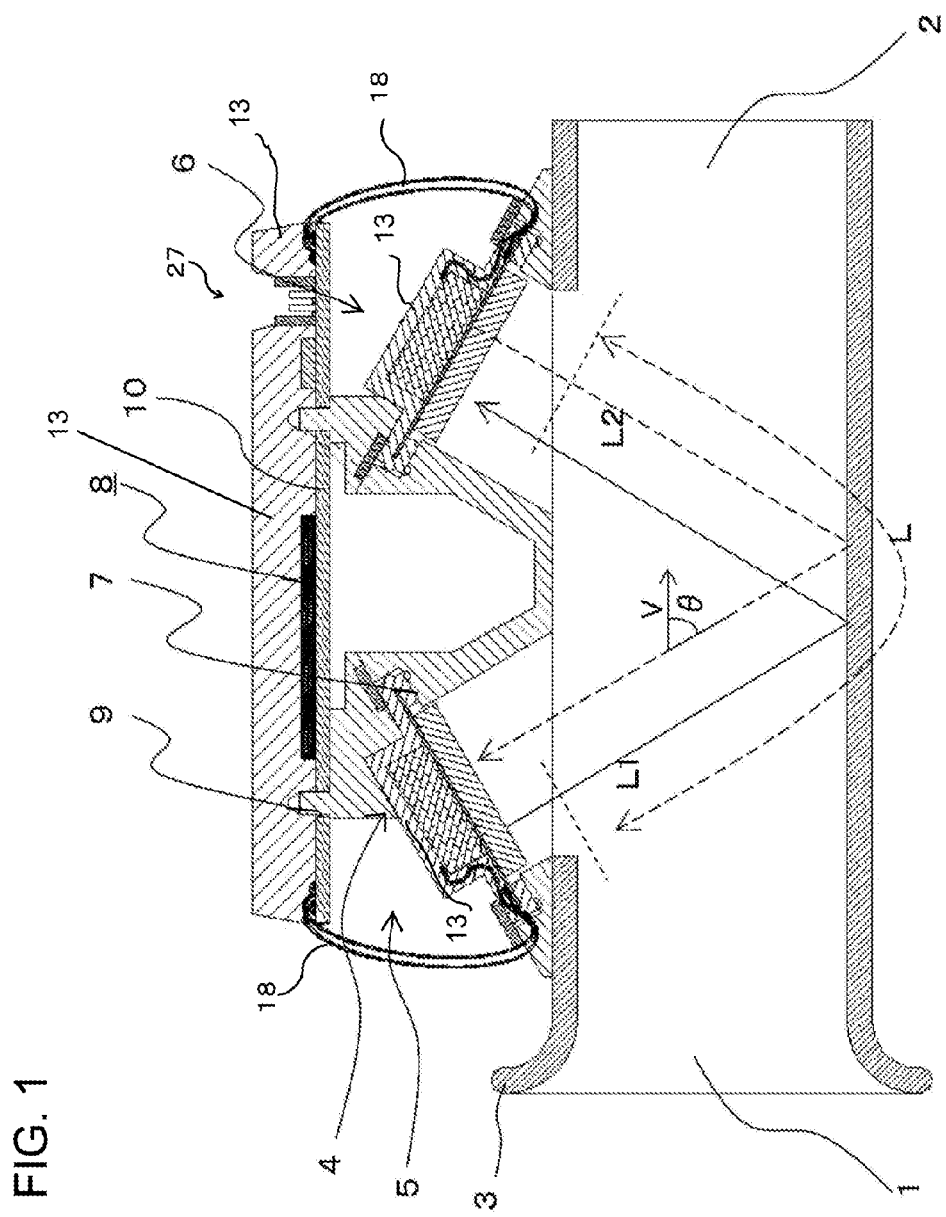
FIG. 1 is a cross-sectional view of an ultrasonic flow meter unit according to Embodiment 1 of the present invention.

According to a first aspect of the present invention, there is provided an ultrasonic flow meter unit mounted to a fluid passage through which a measurement target fluid flows, the ultrasonic flow meter unit comprising: a pair of ultrasonic transducers each including a piezoelectric substrate which generates an ultrasonic pulse, and an acoustic matching member, the pair of ultrasonic transducers being placed on the fluid passage such that the ultrasonic transducers mutually transmit and receive the ultrasonic pulse; a measuring circuit which is placed to contact the fluid passage, and measures a flow of the measurement target fluid based on time for which the ultrasonic pulse propagates between the pair of ultrasonic transducers; and an insulating damping member unitarily formed to cover at least a portion of each of a portion of each of the pair of ultrasonic transducers, which portion contacts the fluid passage, the piezoelectric substrate, and the measuring circuit.

In this configuration, it becomes possible to effectively reduce a casing propagation noise which is generated by transmission of a vibration generated in one of the pair of ultrasonic transducers to the other ultrasonic transducer, through the fluid passage, or the measuring circuit, and a reverberant noise induced by the vibrations transmitted to the members, thus implementing highly-accurate flow measurement.

According to a second aspect of the present invention, the ultrasonic flow meter unit of the first aspect, may further comprise: a lead wire electrically connecting the piezoelectric substrate to the measuring circuit; wherein the insulating damping member covers at least a portion of each of a portion of each of the pair of ultrasonic transducers, which portion contacts the fluid passage, the piezoelectric substrate, the measuring circuit, and the lead wire. In this configuration, it becomes possible to effectively reduce a casing propagation noise which is generated by transmission of a vibration generated in one of the pair of ultrasonic transducers to the other ultrasonic transducer, through the fluid passage, the measuring circuit, or the lead wires, and a reverberant noise induced by the vibrations transmitted to the members, thus implementing highly-accurate flow measurement.

According to a third aspect of the present invention, in the ultrasonic flow meter unit of the second aspect, at least a portion of each of a portion of each of the pair of ultrasonic transducers, which portion contacts the fluid passage, the piezoelectric substrate, the measuring circuit, the lead wire, and a portion of the measuring circuit, which portion contacts the fluid passage, may be covered. In this configuration, it becomes possible to effectively reduce a casing propagation noise which is generated by transmission of a vibration generated in one of the pair of ultrasonic transducers to the other ultrasonic transducer, through the fluid passage, the measuring circuit, or the lead wire, and a reverberant noise induced by the vibrations transmitted to the members, thus implementing highly-accurate flow measurement.

According to a fourth aspect of the present invention, in the ultrasonic flow meter unit of any one of the first to third aspects, each of the ultrasonic transducers may further include a metal plate; and the acoustic matching member may be fastened to one of surfaces of the metal plate, and the piezoelectric substrate is fastened to the other surface of the metal plate. In this configuration, the insulating damping member can be formed unitarily over the outer periphery of the piezoelectric substrate, and a contact surface between the metal plate and the fluid passage, in a short time, which increases a productivity.

The metal plate is high in dimension accuracy. Therefore, the ultrasonic transducer can be mounted to the fluid passage with a high accuracy. This can reduce a loss of transmission/reception of an ultrasonic wave in measurement, and hence realize highly-accurate flow measurement.

The metal plate mounted to improve the dimension accuracy is a constituent which easily vibrates by a vibration of the piezoelectric substrate. Since the insulating damping member is formed unitarily with an adhesive force of a specified strength, it becomes possible to efficiently reduce the reverberant vibration due to non-uniformity of mounting of the insulating damping member, and realize highly-accurate flow measurement.

According to a fifth aspect of the present invention, in the ultrasonic flow meter unit of any one of the first to third aspects, each of the ultrasonic transducers may further comprise a metal case including a tubular side wall, a flat plate top portion which covers an opening at one end of the side wall, and a support portion extending outward from the other end of the side wall; and the piezoelectric substrate may be fastened to an inner surface of the top portion in a position which is inward relative to the side wall, and the acoustic matching member is fastened to an outer surface of the top portion. This allows the insulating damping member to be unitarily formed over the metal case having a top portion and a tubular shape, i.e., intricate shape, in a short time, which can significantly improve a productivity.

According to a sixth aspect of the present invention, there is provided a method of manufacturing an ultrasonic flow meter unit comprising: placing ultrasonic transducers and a measuring circuit into a die; and pouring an insulating damping material into the die to unitarily form an insulating damping member which covers each of the ultrasonic transducers and the measuring circuit, at the same time. This allows the insulating damping member to be unitarily formed over required portions of the ultrasonic transducers and the measuring circuit, with a high accuracy and in a short time, which can significantly improve a productivity.

According to a seventh aspect of the present invention, there is provided a method of manufacturing an ultrasonic flow meter unit comprising: placing ultrasonic transducers and a measuring circuit into a die; electrically connecting the ultrasonic transducers to the measuring circuit, via lead wires; and pouring an insulating damping material into the die to unitarily form an insulating damping member which covers each of the ultrasonic transducers, the measuring circuit, and the lead wires, at the same time. In this method, the ultrasonic flow meter unit can be assembled in a state in which no stress is applied to the lead wires, and the electrodes and the like provided in the measuring circuit and the piezoelectric substrate. Therefore, the ultrasonic flow meter which has a high accuracy and uniform characteristics can be attained. In addition, the insulating damping member can be unitarily formed over required portions of the acoustic matching member, the metal plate or the metal case having a top portion and a tubular shape and the piezoelectric substrate of the ultrasonic transducer, with a high precision and in a short time. Moreover, the insulating damping member can be efficiently formed over a part or entire of the measuring circuit, the surface of the lead wire, and the contact portion between the fluid passage and the circuit. As a result, a productivity can be improved significantly.

Hereinafter, embodiments of the present invention will be described with reference to the drawings. Note that the present invention is not limited the embodiments.

Embodiment 1

FIG. 1 is a cross-sectional view of an ultrasonic flow meter unit according to Embodiment 1 of the present invention, taken along the axis of a pipe wall of a fluid passage.

Referring to FIG. 1, a fluid passage 3 is a pipe through which a target fluid (hereinafter will be simply referred to as "fluid") flows from an opening end 1 to an opening end 2. A pair of ultrasonic transducers 5, 6 are mounted to the fluid passage 3 such that the ultrasonic transducers 5, 6 mutually transmit and receive an ultrasonic pulse. Specifically, for example, ultrasonic transducer mounting members 4 are mounted to the openings formed in the pipe wall of the fluid passage 3, and the ultrasonic transducers 5, 6 are joined and mounted to contact portions 7 of the ultrasonic transducer mounting members 4, respectively. In this case, the ultrasonic transducers 5, 6 are mounted to the pipe wall of the fluid passage 3 via the ultrasonic transducer mounting members 4. Therefore, the fluid passage 3 includes the pipe wall and the ultrasonic transducer mounting members 4. However, the fluid passage 3 may be formed to have a shape which allows the ultrasonic transducers 5, 6 to be directly mounted to the pipe wall. In this case, the ultrasonic transducer mounting members 4 are not used, and the fluid passage 3 is constituted by the pipe wall.

An integrated circuit (measuring circuit 8) having a flow measuring function is placed on the ultrasonic transducer mounting members 4 of the fluid passage 3. Specifically, for example, a control board 10 is placed on the fluid passage 3 in such a manner that protruding contact portions 9 of the ultrasonic transducer mounting members 4 are inserted into holes of the control board 10 in which the measuring circuit 8 is mounted. In this case, the control board 10 in which the measuring circuit 8 is mounted, is in contact with the contact portions 9 of the ultrasonic transducer mounting members 4. The control board 10 includes terminals connecting lead wires 18, and wires connecting the terminals to the measuring circuit 8. Therefore, the measuring circuit 8 is constituted by the integrated circuit and a part of the control board 10.

Hereinafter, a principle of flow measurement will be described with reference to FIG. 1.

In FIG. 1, L1 indicates the path of the ultrasonic pulse propagating (travelling) from the ultrasonic transducer 5 placed at an upstream side of the fluid passage 3, while L2 indicates the path of the ultrasonic pulse propagating from the ultrasonic transducer 6 placed at a downstream side of the fluid passage 3.

Hereinafter, the flow velocity of the fluid flowing through the fluid passage 3 will be represented by V, and the speed at which the ultrasonic pulse propagates through the fluid will be represented by C (not shown). The distance of the path over which the ultrasonic pulse propagates between the pair of ultrasonic transducers 5, 6 will be expressed as L, and the angle formed between the direction in which the fluid flows and the direction in which the ultrasonic pulse propagates will be expressed as θ.

For example, it is assumed that the ultrasonic transducer 5 is used as the ultrasonic transmitter and the ultrasonic transducer 6 is used as the ultrasonic receiver. In this case, the propagation time t1 of the ultrasonic pulse transmitted from the ultrasonic transducer 5 to the ultrasonic transducer 6 is represented by the following formula (1):

$$t1 = L/(C + V \cos \theta) \quad (1)$$

Conversely, it is assumed that the ultrasonic transducer 6 is used as the ultrasonic transmitter and the ultrasonic transducer 5 is used as the ultrasonic receiver. In this case, the propagation time t2 of the ultrasonic pulse transmitted from the ultrasonic transducer 6 to the ultrasonic transducer 5 is represented by the following formula (2):

$$t2 = L/(C - V \cos \theta) \quad (2)$$

From the formula (1) and the formula (2), the flow velocity V of the fluid is derived, which is represented by the following formula (3)

$$V = L/2 \cos \theta (1/t1 - 1/t2) \quad (3)$$

As can be seen from the formula (3), in a case where the distance L and the angle θ are known, the flow velocity V can be derived by measuring the propagation time t1 and the propagation time t2 of the ultrasonic pulse by the measuring circuit 8. The flow Q of the fluid flowing through the fluid passage 3, per unit time, can be found by multiplying the flow velocity V by a cross-sectional area S of the fluid passage 3 and a compensation coefficient K. A calculation means is included in the measuring circuit 8, and calculates the above Q=KSV.

How the ultrasonic transducers 5, 6 are mounted to the fluid passage 3 and the configuration of the ultrasonic transducers 5, 6 will be described in detail.

Figure 2:
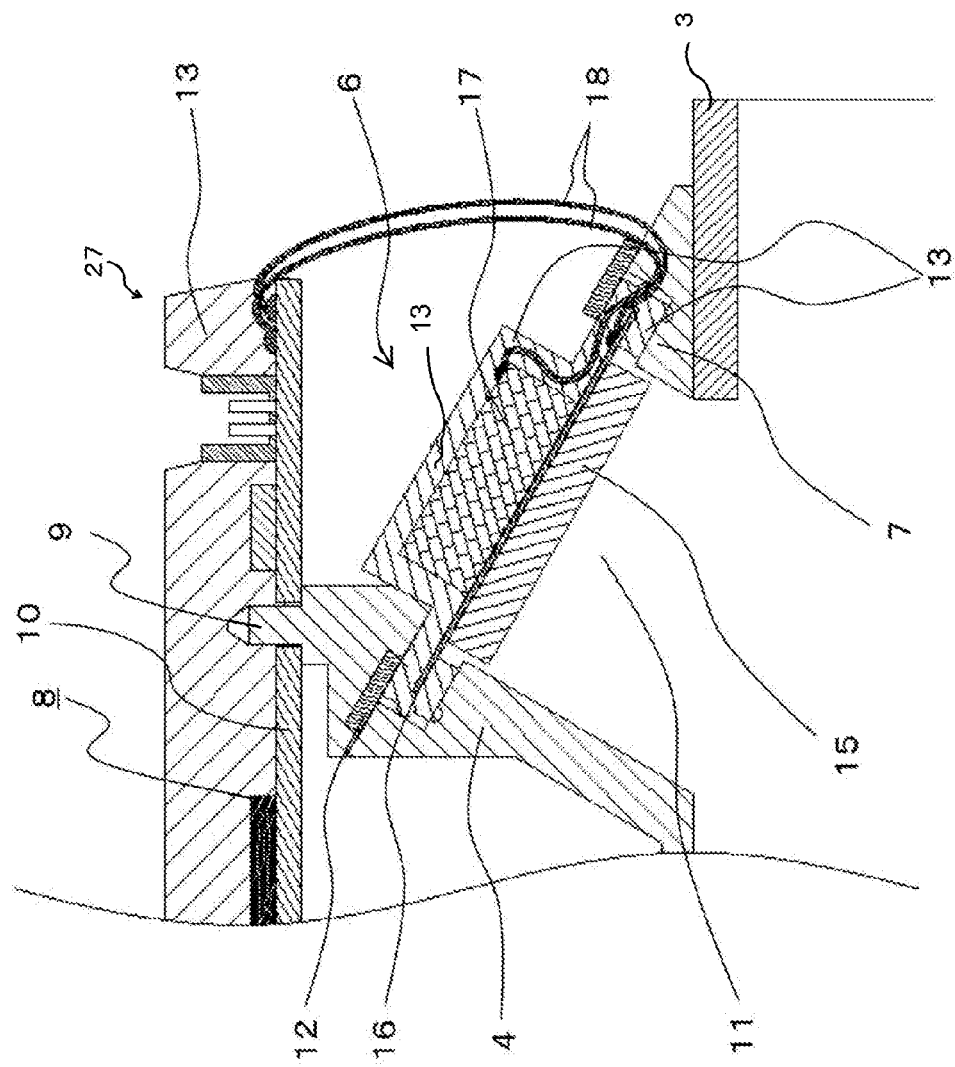
FIG. 2 is a partially enlarged cross-sectional view of the ultrasonic flow meter unit according to Embodiment 1 of the present invention.

FIG. 2 is a partial cross-sectional view of the ultrasonic flow meter unit 27 according to Embodiment 1 of the present invention, which is taken along the axis of the pipe wall of the fluid passage 3. By way of example, the ultrasonic transducer 6 will be described, but the ultrasonic transducer 5 has a similar configuration.

Referring to FIG. 2, the ultrasonic transducer 6 is fastened to an opening 11 of the ultrasonic transducer mounting member 4 via an insulating damping member 13. In this case, the ultrasonic transducer 6 is pressingly fastened to the contact portion 7 of the ultrasonic transducer mounting member 4 from its back surface. The ultrasonic transducer 6 is configured such that an acoustic matching member 15, a metal plate 16 and a piezoelectric substrate 17 are bonded together on their flat portions, by an adhesive, a conductive paste, etc. Lead wires 18 are electrically connected to one electrode of the piezoelectric substrate 17 and to the other electrode of the piezoelectric substrate 17 via the metal plate 16. The metal plate 16 and the piezoelectric substrate 17 are electrically connected to each other by ohmic contact in a case where they are joined together by an adhesive. The insulating damping member 13 is formed to cover at least a portion of each of the outer periphery of the piezoelectric substrate 17, and a portion of the ultrasonic transducer 5, 6 which portion contacts the fluid passage 3. Specifically, the insulating damping member 13 covers a surface of the piezoelectric substrate 17 which surface is other than the surface fastened to the metal plate 16.

The insulating damping member 13 covers a portion of the surface of the metal plate 16, which portion is other than a portion of the surface which portion is fastened to the acoustic matching member 15, a portion of the surface of the metal plate 16, which portion is other than a portion of the surface which portion is fastened to the piezoelectric substrate 17, and an end surface between these fastened surfaces. The insulating damping member 13 is unitarily formed to apply an adhesive force with a specified strength. A portion of the surface of the metal plate 16 to which the acoustic matching member 15 is fastened, which portion faces the contact portion 7 is the portion of the ultrasonic transducer 5, 6 which portion contacts the fluid passage 3.

The acoustic matching member 15 is manufactured in such a manner that glass hollow spherical members are filled into a container by tapping, spacings of the spherical members are filled with a thermoset resin, which is heated, and in this state, to cure the resin. Or, the acoustic matching member 15 is manufactured in such a manner that an acoustic film is bonded to a sound wave radiation surface of a ceramic porous member. The acoustic matching member 15 is able to efficiently propagate the ultrasonic pulse to the target fluid, when its thickness is set to λ/4.

The metal plate 16 may be formed of a metal material such as iron, stainless, brass, copper, aluminum, or nickel-plated steel plate.

The piezoelectric substrate 17 may be formed of any material which indicates a piezoelectric characteristic, and barium titanate, lead zirconate titanate, etc., are suitably used. The piezoelectric substrate 17 and the lead wires 18 are joined together by soldering, the conductive paste, etc. The metal plate 16 and the lead wires 18 may be joined together by soldering, the conductive paste, etc.

The operation and advantage of the ultrasonic transducer 5, 6 configured as described above will be described hereinafter.

The lead wires 18 are electrically joined to the piezoelectric substrate 17. The measuring circuit 8 applies to the piezoelectric substrate 17, a square electric signal with a frequency which is close to a resonant frequency of the piezoelectric substrate 17, via the lead wires 8 and the control board 10. The piezoelectric substrate 17 converts the electric signal to a mechanical vibration, and thus, the ultrasonic pulse is generated. The amplitude of the ultrasonic pulse is increased due to a resonance between the piezoelectric substrate 17, and the acoustic matching member 15. The ultrasonic pulse is radiated from the radiation surface of the acoustic matching member 15, and propagates through the target fluid through the opening 11.

The insulating damping member 13 serves to prevent a vibration generated when the ultrasonic pulse propagates to the target fluid from being transmitted to the ultrasonic transducer mounting member 4, and attenuate a vibration of the piezoelectric substrate 17, and a vibration of the metal plate 16 which receives the vibration of the piezoelectric substrate 17 (reduce reverberant time). The insulating damping member 13 can reduce a possibility that these vibrations are transmitted to the ultrasonic transducer 5 which receives the ultrasonic pulse, and thereby a measuring noise is generated. To realize this, the insulating damping member 13 is formed to cover the outer periphery of the piezoelectric substrate 17, and the outer periphery of the metal plate 16.

The insulating damping member 13, which is similar to the insulating damping member 13 covering the piezoelectric substrate 17 and the metal plate 16, is formed over the upper surface of the measuring circuit 8 and the upper surface of the control board 10. If a vibration generated in the ultrasonic transducer 6 is transmitted to the measuring circuit 8 via the ultrasonic transducer mounting member 4, and then the control board 10, this vibration can be attenuated more efficiently while it is traveling to inside of the measuring circuit 8. Since the insulating damping member 13 formed over the measuring circuit 8 has a relatively low moisture permeation characteristic, the moisture resistance of the ultrasonic flow meter unit can be improved.

The insulating damping member 13 is formed of a thermoplastic resin which is low in glass transition point, for example, thermoplastic elastomer material or a crystalline polyester. As examples of the thermoplastic elastomer material, there are styrene elastomer, olefin elastomer, polyester elastomer, etc.

As the crystalline polyester, there are, for example, an adhesive agent composition disclosed in Japanese Laid-Open Patent Application Publication No. 2006-57043, VYLOSHOT (registered trademark) GM-920, GM-913 manufactured by TOYOBO, Co., Ltd. etc. The glass transition point of the thermoplastic resin is preferably equal to or lower than, for example, −30 degrees C. which is a lowest temperature in the flow measurement of a target fluid (lower limit of guarantee temperature). This allows the insulating damping member 13 to have a rubber elasticity and exhibit a vibration damping (suppressing) function during flow measurement.

The melting point of the thermoplastic resin is preferably equal to or higher than 80 degrees C. which is a highest temperature in the flow measurement (upper limit of guarantee temperature). The storage elastic modulus of the thermoplastic resin is, for example, 4 to 300 MPa in a range of the lowest temperature in the flow measurement to the highest temperature in the flow measurement. This enables the insulating damping member 13 to well absorb a vibration generated in the metal plate 16 and the piezoelectric substrate 17 during the flow measurement.

The insulating damping member 13 configured as described above can be unitarily bonded to the metal plate 16, the piezoelectric substrate 17, and the lead wires 18 such that the metal plate 16, the piezoelectric substrate 17, and the lead wires 18 are allowed to have a specified strength. Regarding adhesive (bonding) strength, the adhesive force with respect to a tin-plated copper wire exhibits a strength of about 10N/cm at maximum in 180 degrees, in view of, for example, the adhesive force with respect to the lead wires 18, although the adhesive strength depends on molding conditions.

The thermoplastic resin used for the insulating damping member 13 has functional group which is easily adsorbed onto the material of the metal plate 16 and the material of the piezoelectric substrate 17. Because of this, by contact with the metal plate 16 and the piezoelectric substrate 17, the insulating damping member 13 exhibits a vibration suppressing (damping) function for suppressing (damping) a vibration of the metal plate 16. The thermoplastic resin used for the insulating damping member 13 has an electric insulativity. Because of this, the insulating damping member 13 prevents electric discharge from the lead wires 18, the metal plate 16, or the like.

As described above, the insulating damping member 13 is unitarily bonded to the piezoelectric substrate 17, and others such that the piezoelectric substrate 17 and others have a specified strength. This can effectively reduce the reverberation of the piezoelectric substrate 17. In addition, it becomes possible to effectively reduce the reverberation generated due to the fact that a vibration transmitted to each of the members such as the control circuit 8 and the lead wires 18, vibrates in its character frequency.

Next, a manufacturing method performed when the insulating damping member 13 is formed over the ultrasonic transducers 5, 6, and the measuring circuit 8, will be described.

FIGS. 3A, 3B, 3C, and 3D are cross-sectional views for explaining the procedure for manufacturing an ultrasonic flow meter unit 27 according to Embodiment 1 of the present invention.

Figure 3A:
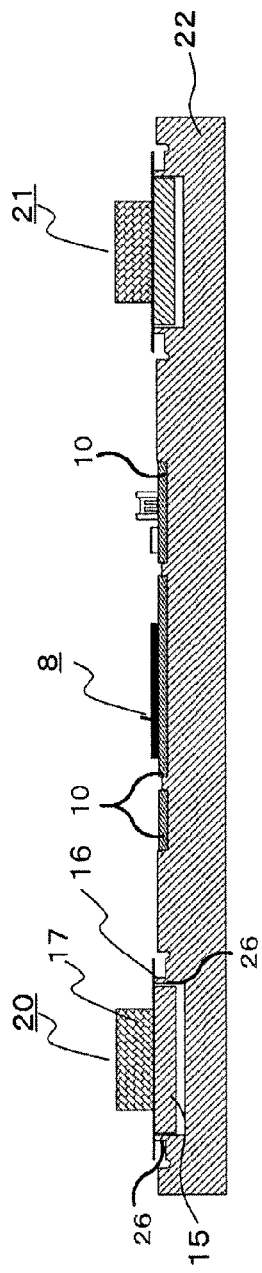
FIGS. 3A, 3B, 3C, and 3D are cross-sectional views for explaining the procedure for manufacturing the ultrasonic flow meter unit according to Embodiment 1 of the present invention.

As shown in FIG. 3A, assemblies 20, 21 each including the acoustic matching member 15, the metal plate 16 and the piezoelectric substrate 17, which are joined together by an adhesive, and the control board 10 with the measuring circuit 8, are placed on a lower die 22. The lower die 22 has recesses corresponding to the assemblies 20, 21, respectively. Each of the recesses is composed of a set of a center recess and an annular recess enclosing the center recess. The center recess is a recess into which the acoustic matching member 15 is fitted, and has a shape corresponding to the shape of the acoustic matching member 15. The annular recess is provided around the center recess to be spaced apart from the center recess. The outer diameter of the annular recess is set larger than the outer diameter of the metal plate 16. A portion between the center recess and the annular recess is used as a die supporting section 26 for supporting the metal plate 16. When the assemblies 20, 21 are placed on the lower die 22, the metal plate 16 is put on the die supporting section 26. Thereby, the acoustic matching member 15 is accommodated into the center recess, while the metal plate 16 is placed on the annular recess. Then, the control board 10 is placed between the two assemblies 20, 21.

Figure 3B:
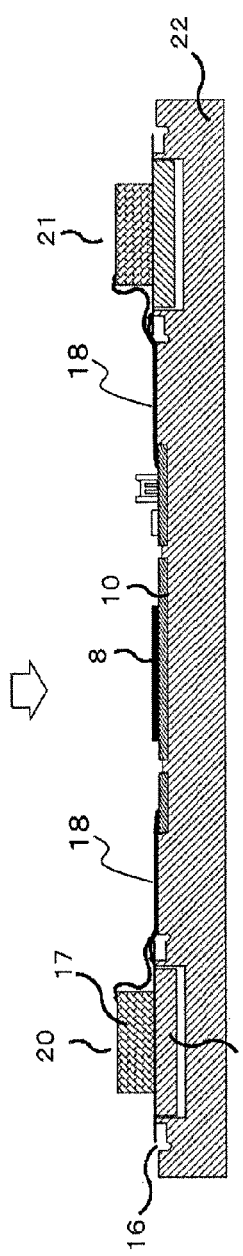

As shown in FIG. 3B, the lead wires 18 are electrically connected to the assemblies 20, 21 and the control board 10 by soldering or the conductive member such as a conductive paste.

Figure 3C:
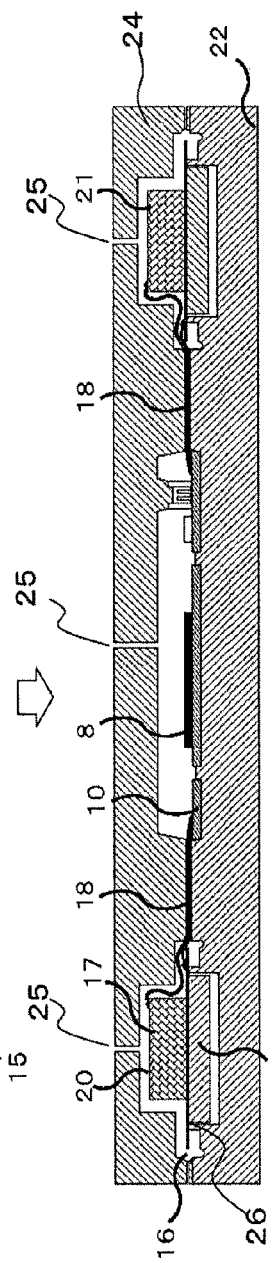

As shown in FIG. 3C, an upper die 24 is placed on the lower die 22. The upper die 24 has recesses for the assemblies 20, 21, and a recess for the measuring circuit 8. Each of the recesses for the assemblies 20, 21 has a shape for allowing the piezoelectric substrate 17 and the metal plate 16 to be covered with a specified distance from the piezoelectric substrate 17 and the metal plate 16. The outer diameter of the recesses for the assemblies 20, 21 is set larger than the outer diameter of the metal plate. The recess for the measuring circuit 8 has a shape for allowing the measuring circuit 8 and the control board 10 to be covered with a specified distance from the measuring circuit 8 and the control board 10. Insertion holes 25 are connected to the recesses for the assemblies 20, 21, and the recess for the measuring circuit 8, respectively. The insertion hole 25 allows communication between inside of each recess and outside of the die.

The material of the insulating damping member 13 which is melted by applying heat and a pressure is poured through the insertion holes 25. This allows the material of the insulating damping member 13 to be filled into the recesses. At this time, the metal plate 16 of each of the assemblies 20, 21 is in contact with die supporting section 26. Because of this, the material of the insulating damping member 13 is blocked by the die supporting section 26. Therefore, the acoustic matching member 15 is not covered with the insulating damping member 13. In addition, the contact portion with the die supporting section 26 is not covered with the insulating damping member 13. As a result, the insulating damping member 13 is not extended non-uniformly over the acoustic matching member 15, and non-uniformity of characteristics of the acoustic matching member 15 can be reduced. Also, the insulating damping member 13 poured into the die is cooled by the die, and thus solidified, in a short time, for example, about 1 minute.

Figure 3D:
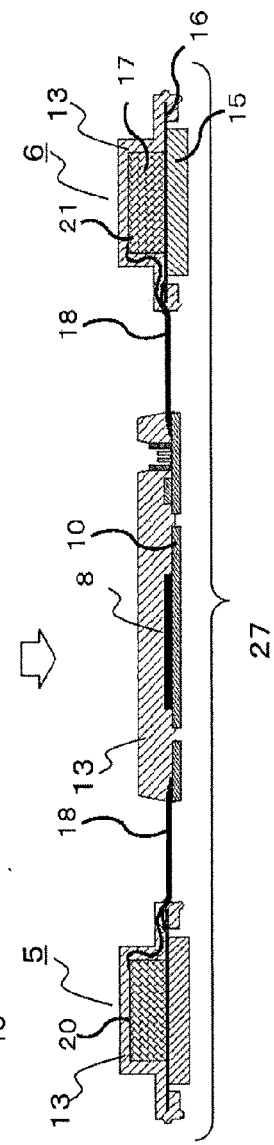

As shown in FIG. 3D, by removing the lower die 22 and the upper die 24, the ultrasonic flow meter unit 27 in which the ultrasonic transducers 5, 6 and the measuring circuit 8 are covered with the insulating damping member 13, is completed. In other words, the ultrasonic transducers 5, 6 and the measuring circuit 8 can be covered with the insulating damping member 13, at the same time.

Note that the location of the insulating damping member 13 can be changed flexibly by changing the shape of the die. For example, in a case where the ultrasonic transducer 5 is used as the ultrasonic transmitter and the ultrasonic transducer 6 is used as the ultrasonic receiver, it is estimated that a vibration which may become a measurement noise propagates through the following three paths:

Path 1: ultrasonic transducer 5→lead wires 18→measuring circuit 8→lead wires 18→ultrasonic transducer 6

Path 2: ultrasonic transducer 5→ultrasonic transducer mounting member 4→measuring circuit 8→ultrasonic transducer mounting member 4→ultrasonic transducer 6

Path 3: ultrasonic transducer 5→ultrasonic transducer mounting member 4→ultrasonic transducer 6

Among these paths, the vibration which becomes the measurement noise which is transmitted through the measuring circuit 8 can be changed to a certain degree depending on the shape of the insulating damping member 13. For example, if the thickness of the insulating damping member 13 is changed in a travelling direction of the vibration which becomes the measurement noise, the magnitude of the vibration changes. As the thickness of the insulating damping member 13, plural heights in a state in which the insulating damping member 13 is not formed, can be chosen. For example, by setting the thickness of 0 mm and 3 mm repeatedly, the vibration which becomes the measurement noise, can be effectively attenuated (mitigated).

As the measuring circuit 8, a flexible board having a flexibility may be used instead of, for example, a glass epoxy board, or a ceramic board which are generally used. The flexible board is very thin. The flexible board is able to effectively attenuate (reduce) a casing propagation noise which is generated by transmission of a vibration generated in one of the pair of ultrasonic transducers to the other ultrasonic transducer, through the fluid passage, the measuring circuit, and the lead wires, and a reverberant noise induced by the vibrations transmitted to the members. In a case where the insulating damping member 13 for covering plural parts is molded within the die at the same time, a rate of defectives of the ultrasonic flow meter unit 27 is reduced, because the flexible board has a resistance to external factors such as a pressure and an ambient temperature.

As the lead wires 18, for example, general lead wires in which copper wires, or tin-placed wires are covered with an insulator may be used. If a flat cable which can lessen the effects produced by a pressure and a stress is employed, in the case of molding using the die, as in the present step, the conductive wire can be considerably thinned, which can efficiently attenuate a vibration transmitted through the lead wires.

Hereinafter, the procedure for manufacturing a measurement passage assembly 29 in which the ultrasonic flow meter unit 27 configured as described above is mounted to the fluid passage 3, will be described.

FIGS. 4A, 4B, and 4C are cross-sectional views for explaining the procedure for manufacturing the measurement passage assembly 29, in which the ultrasonic flow meter unit 27 of Embodiment 1 of the present invention is mounted to the fluid passage 3.

As shown in FIG. 4A, the ultrasonic transducer mounting members 4 are connected to the openings formed in the pipe wall of the fluid passage 3, respectively, to form an assembly unit 28.

The fluid passage 3 and the ultrasonic transducer mounting members 4 are preferably resin-molded components made of a thermoplastic resin. Since the fluid passage 3 and the ultrasonic transducer mounting members 4 directly contact a gas such as a city gas, a LP gas, air or methane which is the target fluid, they must be formed of a resin which is resistant to these gases or an odor material. In view of this, for example, polyacetal, polybutylene terephthalate, polyphenylene sulfide, liquid crystal polymer, etc., are more preferably used. Instead of these resins, any resin which is resistant to the measurement gas may be used. Thermoset resin may also be used. For example, epoxy resin, polyamide resin, phenol resin, melanin resin, etc., may be used by keeping them in the die at a constant temperature so that they are cured, and thereafter taking it out of the die. In this case, it is necessary to perform a mold release process on the die. The mold release process is performed effectively by coating a fluorine-based resin which reduces surface free energy.

When the fluid passage 3 and the ultrasonic transducer mounting members 4 are formed of the thermoplastic resin, they may be fastened together by welding, bonding, screws, etc. When the fluid passage 3 and the ultrasonic transducer mounting members 4 are formed of a thermoset resin, they may be fastened together by bonding, screws, etc.

Then, as shown in FIG. 4B, the ultrasonic flow meter unit 27 is connected to the assembly unit 28. At this time, the portions of the ultrasonic transducers 5, 6, which portions contact the fluid passage 3, are covered with the insulating damping member 13. Therefore, the surface of each of the metal plates 7 which surface is closer to the acoustic matching member 15 is caused to contact the contact portion 7 of the ultrasonic transducer mounting member 4. In a state in which the contact portions 9 of the ultrasonic transducer mounting members 4 are inserted into the openings of the control board 10, respectively, the contact portions 9 are in contact with the control board 10 via the insulating damping members 13. Also, the ultrasonic transducers 5, 6 are each positioned by the contact portions 7, 9.

As shown in FIG. 4C, the ultrasonic flow meter unit 27 is mounted to the pipe wall of the fluid passage 3 via the ultrasonic transducer mounting members 4, thereby completing the measurement passage assembly 29.

Now, how to assemble the ultrasonic flow meter unit assembled by the above described procedure, as an ultrasonic flow meter, for example, a gas meter, will now be described.

Figure 5:
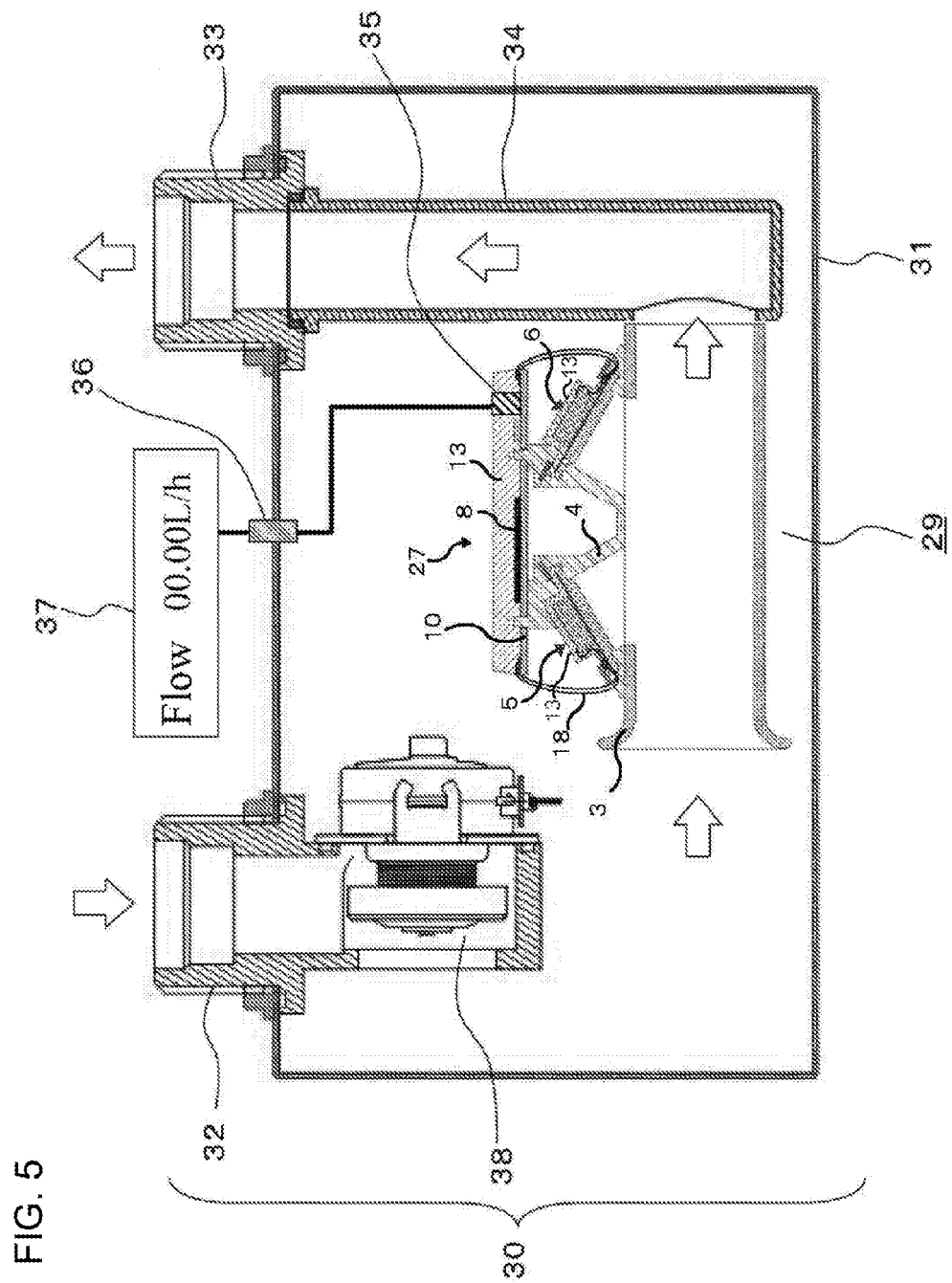
FIG. 5 is a cross-sectional view of a gas meter incorporating the ultrasonic flow meter unit according to Embodiment 1 of the present invention.

FIG. 5 is a cross-sectional view of the gas meter according to Embodiment 1 of the present invention.

As shown in FIG. 5, a gas meter 30 is a container in which a gas is filled in a casing 31. An inlet ferrule 32 is connected to a gas supply pipe, while an exit ferrule 33 is connected to a pipe for home. The measurement passage assembly 29 in which the ultrasonic flow meter unit 27 is mounted to the fluid passage 3 is connected to an exit pipe 34. Measurement information from the ultrasonic flow meter unit 27 is output from a connector 35 connected to the control board 10 to a display section 37 of the gas meter via a seal member 36 and displayed thereon. When the gas meter determines an abnormality such as a gas leakage, a shutoff valve 38 mounted to the inlet ferrule 32 shuts off the pipe connected to the inlet ferrule 32.

As described above, by using the measurement passage assembly 29 of the ultrasonic flow meter unit 27, the gas meter can be easily attained.

As described above, in the present embodiment, the ultrasonic flow meter unit 27 is mounted to the fluid passage 3 in which the target fluid flows from the opening end 1 on one side to the opening end 2 on the other side. The ultrasonic flow meter unit 27 includes the pair of ultrasonic transducers 5, 6 placed such that they are able to transmit and receive the ultrasonic pulse, the measuring circuit 8 which is placed on the fluid passage and calculates the flow of the fluid based on transit time (propagation time) between the pair of ultrasonic transducers 5, 6, and the insulating damping (vibration suppression) member 13 formed at the same time to cover at least a portion of each of a portion of each of the ultrasonic transducers 5, 6 which portion contacts the fluid passage 3, the piezoelectric substrate 17, and the measuring circuit 8.

In this configuration, it becomes possible to effectively reduce a noise vibration which is generated by transmission of a vibration generated in the ultrasonic transducer 5 to the ultrasonic transducer 6, through the measuring circuit 8. Therefore, a reduction of the measurement precision of the fluid can be suppressed, and highly-accurate flow measurement can be realized.

Each of the ultrasonic transducers 5, 6 includes the metal plate 16, the acoustic matching member 15 fastened to one surface of the metal plate 16, and the piezoelectric substrate 17 fastened to the other surface of the metal plate 16. This allows the insulating damping member 13 to be unitarily formed at the same time over the outer periphery of the piezoelectric substrate 17, and the surface of the metal plate 16 which surface contacts the fluid passage 3.

The ultrasonic transducers 5, 6 and the measuring circuit 8 are placed in the die, and the material of the insulating damping member is poured into the die. This makes it possible to form the insulating damping member 13 covering the ultrasonic transducers 5, 6 and the insulating damping member 13 covering the measuring circuit 8 at the same time. In this way, the insulating damping member 13 can be formed over the required portions of the acoustic matching member 15, the metal plate 16 and the piezoelectric substrate 17, with a high dimension accuracy and in a short time, at the same time. In addition, the insulating damping member 13 can be formed efficiently over a part or entire of the measuring circuit 8, the surface of the lead wires 18, and the portion of the measuring circuit 8 which portion contacts the fluid passage 3. As a result, a productivity can be significantly improved.

After the ultrasonic transducers 5, 6 and the measuring circuit 8 are placed in the die, and the ultrasonic transducers 5, 6 are electrically connected to the measuring circuit 8 via the lead wires 18, the material of the insulating damping member 13 is poured into the die. During the manufacturing, the ultrasonic flow meter unit 27 can be assembled in a state in which no stress is applied to the lead wires 18, and electrodes and the like provided in the measuring circuit 8, and the piezoelectric member 17. Therefore, the ultrasonic flow meter 27 which has a high accuracy and uniform characteristics can be attained.

The measuring circuit 7 is constituted by the flexible board. The rate of defectives of the ultrasonic flow meter unit 27 is reduced, because the flexible board has a resistance to external factors such as a pressure and an ambient temperature, during manufacturing of the insulating damping member 13.

The lead wires 18 are the flat cables. Since the lead wires 18 can be considerably thinned, it becomes possible to efficiently mitigate a vibration transmitted through the lead wires 18.

The insulating damping member 13 is formed of the thermoplastic resin which has an adhesivity and in which the glass transition point is equal to or lower than the lower limit of the guarantee temperature in the flow measurement. This can make the insulating damping member 13 flexible in the temperature range of the flow measurement. It becomes possible to effectively suppress a vibration generated in the ultrasonic transducer 5 from being transmitted to the ultrasonic transducer 6. This can suppress a reduction of accuracy of the flow measurement and implement the highly-accurate flow measurement.

Embodiment 2

Figure 6A:
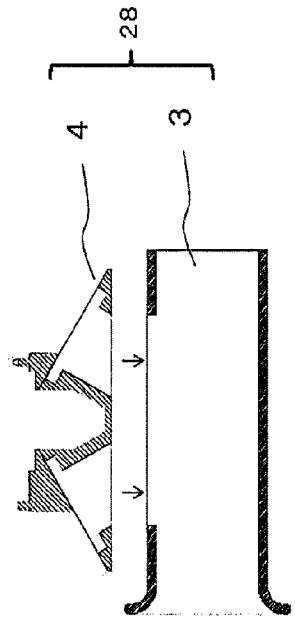
FIGS. 6A, 6B, and 6C are cross-sectional views for explaining the procedure for manufacturing, in which an ultrasonic flow meter unit of Embodiment 2 of the present invention is mounted to a fluid passage.
Figure 6B:
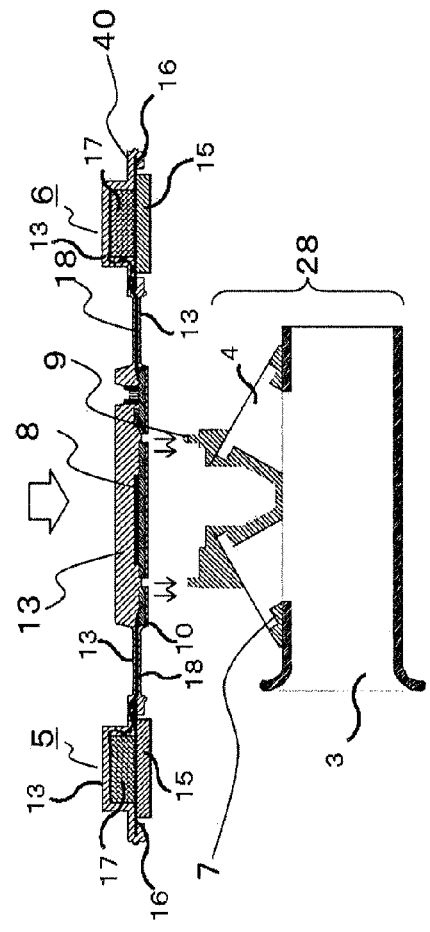
Figure 6C:
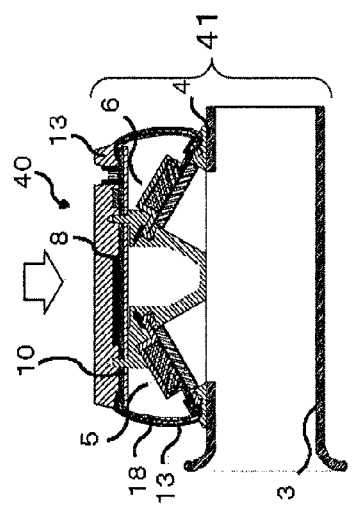

FIGS. 6A, 6B, and 6C are cross-sectional views for explaining the procedure for manufacturing an ultrasonic flow meter unit 40 according to Embodiment 2 of the present invention.

As in the case of the example of FIG. 4A, as shown in FIG. 6A, the ultrasonic transducer mounting members 4 are connected to the fluid passage 3, to form the assembly unit 28.

As shown in FIG. 6B, the ultrasonic flow meter unit 40, and the assembly unit 28 are positioned by the contact portions 7, 9, and are joined together.

The ultrasonic flow meter unit 40 is a unit in which the insulating damping member 13 is formed over the required portions of the ultrasonic transducers 5, 6, the measuring circuit 8, and the lead wires 18. In the ultrasonic flow meter unit 40, the insulating damping member 13 is formed over the entire surface of the lead wires 18, and a portion between the measuring circuit 8 and the assembly unit 28 of the fluid passage 3 and the ultrasonic transducer mounting members 4 (portion of the measuring circuit 8 which portion contacts the fluid passage 3, more specifically portion of the control board 10 which portion contacts the fluid passage 3).

The manufacturing method and material of the insulating damping member 13 are similar to those of Embodiment 1, and will not be described.

As described above, in the present embodiment, in addition to the range of the insulating damping member 13 of Embodiment 1, the insulating damping member 13 is formed over the lead wires 18 electrically connecting the piezoelectric substrate 17 to the measuring circuit 8. The insulating damping member 13 is formed unitarily at the same time to apply an adhesive force with a specified strength. In this configuration, it becomes possible to effectively reduce a casing propagation noise which is generated by transmission of a vibration generated in the ultrasonic transducer 5 to the ultrasonic transducer 6 through the fluid passage 3, the measuring circuit 8, or the lead wires 18, and a reverberant noise induced by the vibrations transmitted to the members, thus implementing highly-accurate flow measurement.

In addition to the lead wires 18 electrically connecting the piezoelectric substrate 17 to the measuring circuit 8, the insulating damping member 13 is formed over a portion of the measuring circuit 8 which portion contacts the fluid passage 3 (specifically, portion of the control board 10 which contacts the fluid passage 3). The insulating damping member 13 is formed unitarily to apply an adhesive force with a specified strength. In this configuration, it becomes possible to effectively reduce a casing propagation noise which is generated by transmission of a vibration generated in the ultrasonic transducer 5 to the ultrasonic transducer 6 through the fluid passage 3, the measuring circuit 8, or the lead wires 18, and a reverberant noise induced by the vibrations transmitted to the members, thus implementing highly-accurate flow measurement.

Embodiment 3

Figure 7:
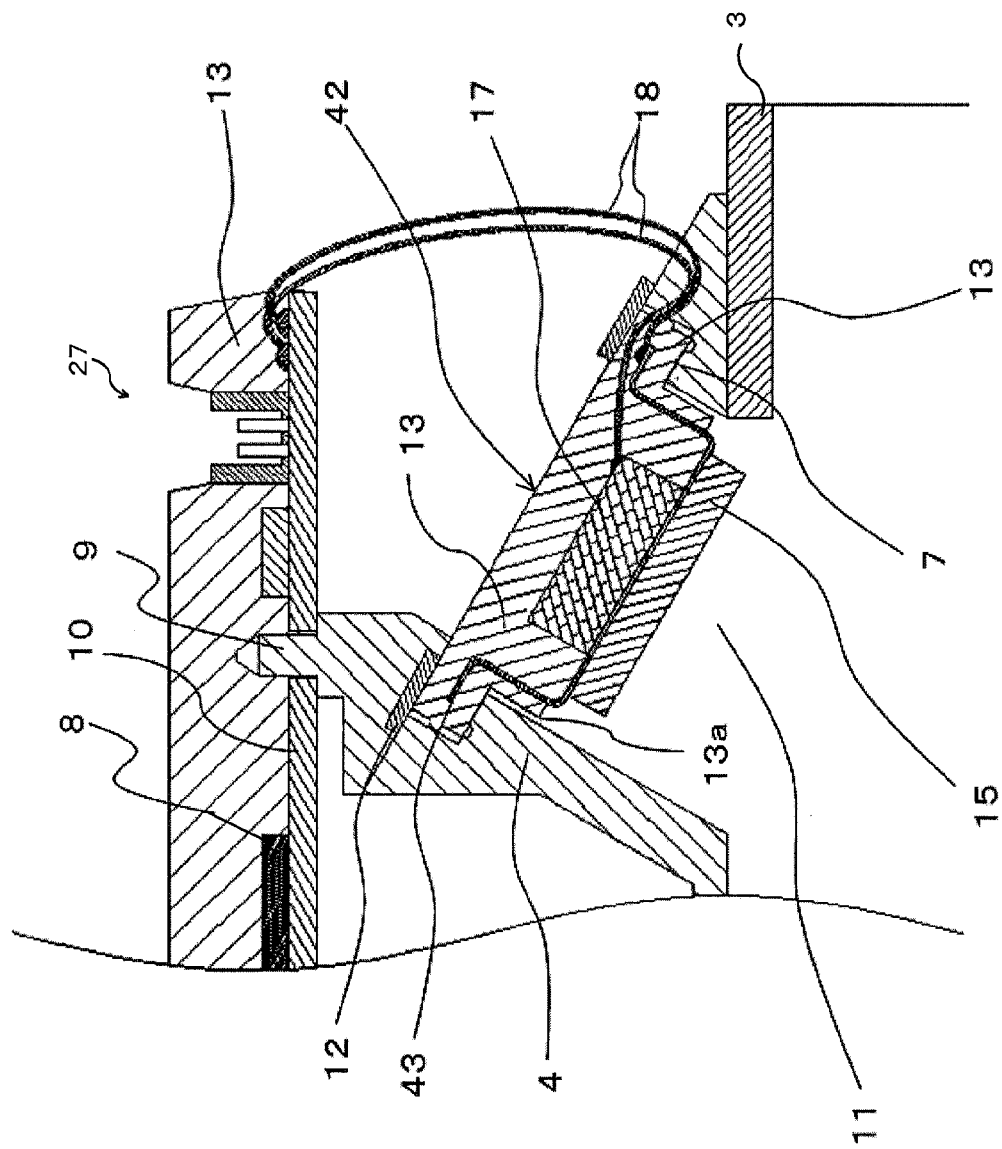
FIG. 7 is a partially enlarged cross-sectional view of an ultrasonic flow meter unit according to Embodiment 3 of the present invention.

FIG. 7 is partial a cross-sectional view of an ultrasonic flow meter unit 27 according to Embodiment 3 of the present invention, taken along the axis of the pipe wall of the fluid passage 3.

Referring to FIG. 7, an ultrasonic transducer 42 is fastened to the opening 11 of the ultrasonic transducer mounting member 4 via the insulating damping member 13. In this case, the ultrasonic transducer 42 is pressingly fastened to the contact portion 7 of the ultrasonic transducer mounting member 4 from its back surface.

The ultrasonic transducer 42 includes a metal case 43 having a top portion and a tubular shape, the piezoelectric substrate 17, and the acoustic matching member 15. The metal case 43 having a top portion and a tubular shape, has a tubular side wall, a flat plate top portion covering the opening at one end of the side wall, and a support portion extending outward from the other end of the side wall. The piezoelectric substrate 17 is fastened to the inner surface of the top portion of the metal case 43, in a position that is inward relative to the side wall of the metal case 43. The acoustic matching member 15 is fastened to the outer surface (radiation surface of ultrasonic pulse) of the metal case 43. The piezoelectric substrate 17, the metal case 43, and the acoustic matching member 15 are bonded together on their flat portions, by an adhesive, a conductive paste, etc. One of the lead wires 18 is electrically connected to one of the electrodes of the piezoelectric substrate 17, while the other of the lead wires 18 is connected to the other electrode of the piezoelectric substrate 17 via the metal case 43. The metal case 43 and the piezoelectric substrate 17 are electrically connected to each other by ohmic contact in a case where they are joined together by an adhesive. The insulating damping member 13 is formed to cover the outer periphery of the piezoelectric substrate 17. The insulating damping member 13 covers a surface of the metal case 43, which surface contacts the ultrasonic transducer mounting member 4, and the outer periphery of the metal case 43 which is mounted to the piezoelectric substrate 17. The insulating damping member 13 is unitarily formed to apply an adhesive force with a specified strength.

The acoustic matching member 15 and the piezoelectric substrate 17 are similar to those of Embodiment 1, and will not be described repeatedly.

The metal case 31 having a top portion and a tubular shape, may be formed of, for example, a metal material such as iron, stainless, brass, copper, aluminum, or nickel-plated steel plate, which can be manufactured by a deep-drawing process.

The operation and advantages of the ultrasonic flow meter unit 27 including the ultrasonic transducer 42 configured as described above are similar to those of Embodiment 1, and will not be described repeatedly. In the ultrasonic transducer 42 of the present embodiment, the piezoelectric substrate 17 and the acoustic matching member 15 are bonded to the outer wall of the top portion of the tubular metal case 43, including the top portion, the side wall, and the support portion extending outward from the side wall. This allows the insulating damping member 13 to be unitarily formed over the metal case 43 having a top portion and a tubular shape, i.e., intricate shape, in a short time. As a result, a productively can be significantly improved.

In addition, the surface of the ultrasonic transducer 42 which surface contacts the fluid passage 3, is distant from the piezoelectric substrate 17, and the metal case 43 having a top portion and a tubular shape, has a bent portion. This makes it possible to suppress a reverberant vibration which becomes a noise in measurement from continuing for a long time.

Furthermore, the top portion of the metal case 43 has a high flatness formed by processing, and is able to radiate the ultrasonic pulse in a desired direction with a high accuracy. Therefore, the ultrasonic flow meter unit 27 can attain a high accuracy.

Moreover, a portion 13a of the insulating damping member 13, which is located at the outer periphery of the side wall of the metal case 43 may be protruded toward the fluid passage farther than the top portion of the metal case 43, although this is not shown. Even when a stress or an impact is applied to the acoustic matching member 15 during assembling, the protruded portion 13a of the insulating damping member 13 can protect the acoustic matching member 15. Because of this, assembling can be easily carried out, and a productivity can be made much higher. This is also applicable to the example of FIG. 2 of Embodiment 1 described above, and to the example of FIG. 8 of Embodiment 4 which will be described later.

Embodiment 4

Figure 8:
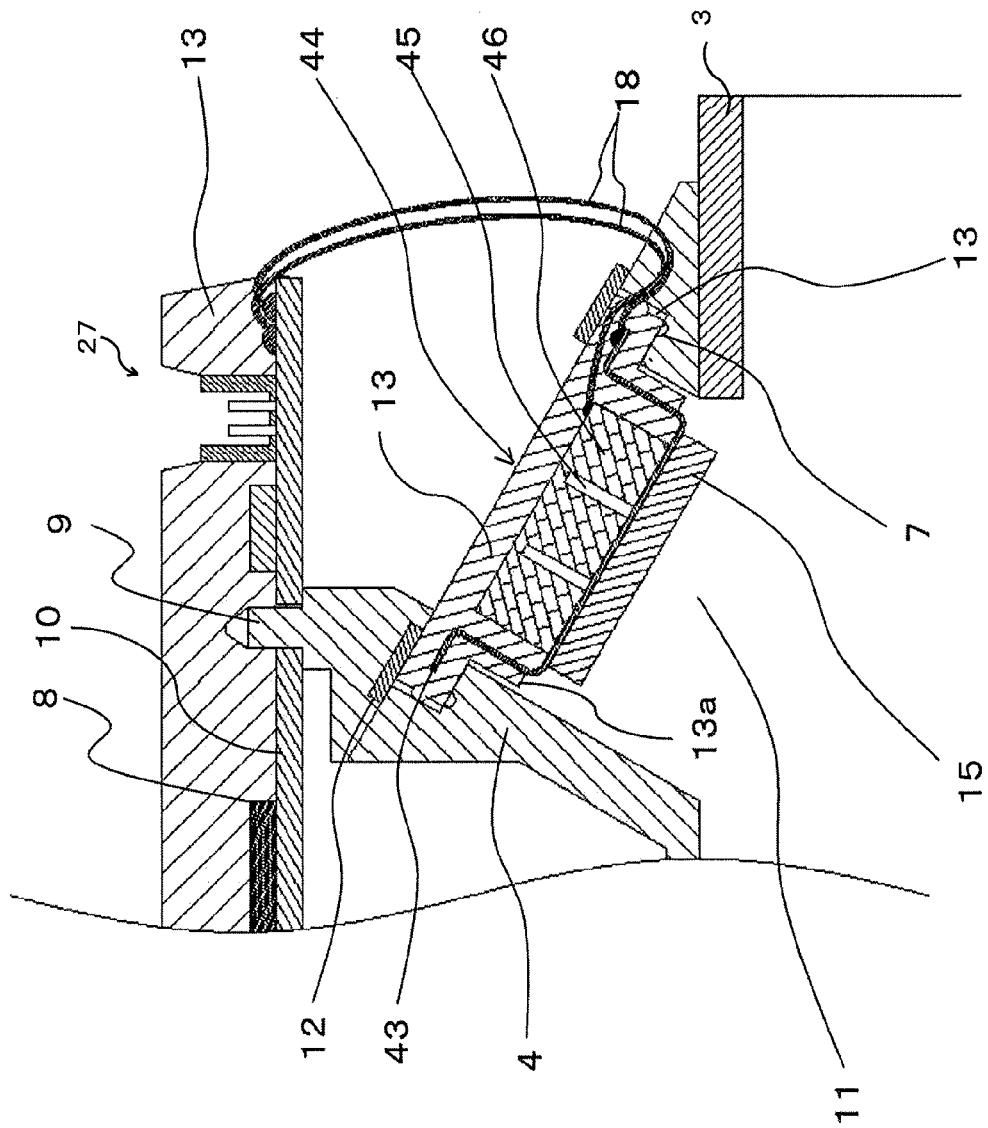
FIG. 8 is a partially enlarged cross-sectional view of an ultrasonic flow meter unit according to Embodiment 4 of the present invention.
Figure 9:
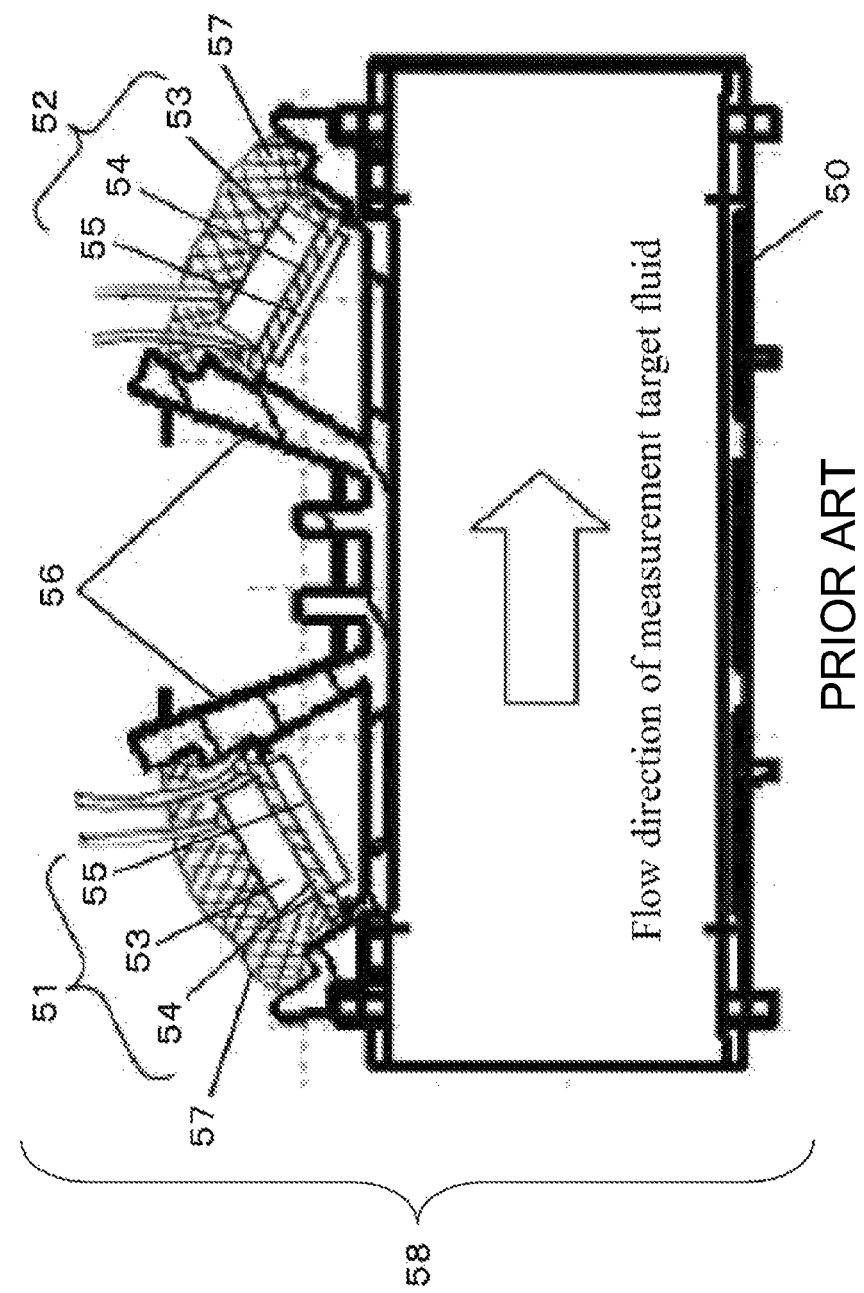
FIG. 9 is a cross-sectional view of a conventional ultrasonic flow meter unit.

FIG. 8 is a partial cross-sectional view of an ultrasonic flow meter unit 27 according to Embodiment 4 of the present invention, taken along the axis of the pipe wall of the fluid passage 3.

Referring to FIG. 8, an ultrasonic transducer 44 is configured such that a piezoelectric substrate 46 is provided with a groove 45. The groove 45 is formed to be accommodated within the inner wall surface of the top portion of the metal case 43 having a top portion and a tubular shape, and extends in a direction perpendicular to the top portion of the metal case 43. This groove 45 is formed by dicing. The other configuration is similar to that of Embodiment 1 and will not be described repeatedly. The operation and advantage which are similar to those of Embodiment 1 will not be described repeatedly. In Embodiment 4, since the groove 45 is formed in the piezoelectric substrate 46, an undesired vibration of the piezoelectric substrate 46 can be suppressed, and an ultrasonic vibration can be transmitted to the target fluid more efficiently. As a result, the ultrasonic wave can be efficiently transmitted to the target fluid, and highly-accurate flow measurement can be attained.

INDUSTRIAL APPLICABILITY

As described above, the present invention can significantly improve a productivity and perform highly-accurate flow measurement, and therefore is applicable to a home flow meter, an industrial flow meter, a meter unit, etc.

What is claimed is:

1. An ultrasonic flow meter unit mounted to a fluid passage through which a measurement target fluid flows, the ultrasonic flow meter unit comprising:
   a pair of ultrasonic transducers each including a piezoelectric substrate which generates an ultrasonic pulse, and an acoustic matching member, the pair of ultrasonic transducers being placed on the fluid passage such that the ultrasonic transducers mutually transmit and receive the ultrasonic pulse;
   a measuring circuit which is placed to connect with the fluid passage, and measures a flow of the measurement target fluid based on time for which the ultrasonic pulse propagates between the pair of ultrasonic transducers, wherein the measuring circuit and the pair of ultrasonic transducers are spaced apart from each other; and
   an insulating damping member arranged to cover both the measuring circuit and the pair of ultrasonic transducers such that the insulating damping member selectively covers the pair of ultrasonic transducers by contacting a mounting member arranged between each ultrasonic transducer and the fluid passage and covering the piezoelectric substrate, wherein the insulating damping member is arranged adjacent to the acoustic matching member without contacting the acoustic matching member.

2. The ultrasonic flow meter unit according to claim 1, further comprising:
   a lead wire electrically connecting the piezoelectric substrate to the measuring circuit;

wherein the insulating damping member is arranged to further cover the lead wire.

3. The ultrasonic flow meter unit according to claim 2, further comprising ultrasonic transducer mounting members arranged between the fluid passage and a control board where the measuring circuit is mounted, the ultrasonic transducers mounted and jointed to the ultrasonic transducer mounting members, wherein each ultrasonic transducer mounting member comprises a protruding contact portion which contacts, via a hole of the control board, the insulating damping member arranged to cover the measuring circuit.

4. The ultrasonic flow meter unit according to claim 1,
wherein each of the ultrasonic transducers further includes a metal plate; and
wherein the acoustic matching member is fastened to one of surfaces of the metal plate, and the piezoelectric substrate is fastened to the other surface of the metal plate.

5. The ultrasonic flow meter unit according to claim 1,
wherein each of the ultrasonic transducers further comprises a metal case including a tubular side wall, a flat plate top portion which covers an opening at one end of the side wall, and a support portion extending outward from the other end of the side wall; and
wherein the piezoelectric substrate is fastened to an inner surface of the top portion in a position which is inward relative to the side wall, and the acoustic matching member is fastened to an outer surface of the top portion.

* * * * *